(12) United States Patent
Balkowski et al.

(10) Patent No.: US 10,598,542 B2
(45) Date of Patent: Mar. 24, 2020

(54) METHOD FOR OPERATING A MACHINE PLANT HAVING A SHAFT TRAIN

(71) Applicant: Siemens Aktiengesellschaft, Munich (DE)

(72) Inventors: Ingo Balkowski, Kerken (DE); Ulrich Ehehalt, Essen (DE); Oliver Hensel, Mülheim an der Ruhr (DE); Dirk Huckriede, Korschenbroich (DE); Thomas Küpper, Kaarst (DE); Bernd Lacombe, Raesfeld (DE); Ümit Mermertas, Mülheim an der Ruhr (DE); Uwe Pfeifer, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 443 days.

(21) Appl. No.: 15/505,328

(22) PCT Filed: Aug. 27, 2015

(86) PCT No.: PCT/EP2015/069642
§ 371 (c)(1),
(2) Date: Feb. 21, 2017

(87) PCT Pub. No.: WO2016/034487
PCT Pub. Date: Mar. 10, 2016

(65) Prior Publication Data
US 2017/0254696 A1  Sep. 7, 2017

(30) Foreign Application Priority Data

Sep. 1, 2014 (EP) .................................... 14183042

(51) Int. Cl.
*G01H 1/14* (2006.01)
*G01H 1/10* (2006.01)
(Continued)

(52) U.S. Cl.
CPC ............... *G01H 1/14* (2013.01); *F01D 5/027* (2013.01); *F01D 5/04* (2013.01); *F01D 5/06* (2013.01);
(Continued)

(58) Field of Classification Search
CPC ....................................................... G01H 1/14
See application file for complete search history.

(56) References Cited

U.S. PATENT DOCUMENTS

| 4,697,460 A | 10/1987 | Sugiyama et al. |
| 4,751,657 A | 6/1988 | Imam et al. |

(Continued)

FOREIGN PATENT DOCUMENTS

| CN | 1748129 A | 3/2006 |
| CN | 203432784 U | 2/2014 |

(Continued)

OTHER PUBLICATIONS

RU search report dated Apr. 10, 2018,f or RU patent application No. 2017110489.
(Continued)

*Primary Examiner* — Manuel L Barbee
*Assistant Examiner* — Raymond L Nimox
(74) *Attorney, Agent, or Firm* — Beusse Wolter Sanks & Maire

(57) ABSTRACT

A method for operating a machine plant having a shaft train, including: a) determining the harmonic frequency of a torsional vibration mode of the shaft train and determining mechanical stresses arising during a vibration period of the torsional vibration mode; b) determining a correlation for each torsional vibration mode between a first stress amplitude, at a position of the shaft train that carries risk of stress damage, and a second stress amplitude, at a measurement location of the shaft train, using stresses determined for the (Continued)

respective torsional vibration mode; c) establishing a maximum first stress amplitude for the position; d) establishing a maximum second stress amplitude, corresponding to the maximum first stress amplitude, for the measurement location; e) measuring the stress of the shaft train while rotating; f) determining a stress amplitude at each harmonic frequency; g) emitting a signal when the stress amplitude reaches the maximum second stress amplitude.

15 Claims, 2 Drawing Sheets

(51) Int. Cl.
G01H 1/16 (2006.01)
F01D 5/02 (2006.01)
F01D 17/04 (2006.01)
F01D 21/00 (2006.01)
F01D 5/26 (2006.01)
F01D 5/06 (2006.01)
F01D 5/04 (2006.01)

(52) U.S. Cl.
CPC .............. F01D 5/26 (2013.01); F01D 17/04 (2013.01); F01D 21/003 (2013.01); G01H 1/10 (2013.01); G01H 1/16 (2013.01)

(56) References Cited

U.S. PATENT DOCUMENTS

| 5,068,800 A * | 11/1991 | Brook ................... G01H 13/00 340/680 |
| 5,159,563 A * | 10/1992 | Miller ................... G01H 13/00 340/683 |
| 5,365,787 A * | 11/1994 | Hernandez ............ G01H 1/003 324/207.25 |
| 5,533,400 A * | 7/1996 | Gasch ................... G01H 1/003 73/593 |
| 8,504,338 B2 * | 8/2013 | Liang ..................... G01H 1/003 703/7 |
| 2005/0183504 A1* | 8/2005 | Hobelsberger ......... G01H 1/003 73/593 |
| 2006/0048581 A1 | 3/2006 | Bosselmann et al. |
| 2006/0244425 A1* | 11/2006 | Sihler ..................... H02P 9/105 322/58 |
| 2009/0025488 A1* | 1/2009 | Sihler ..................... G01L 3/102 73/862.333 |
| 2009/0320609 A1 | 12/2009 | Xia et al. |
| 2010/0141193 A1 | 6/2010 | Rotondo et al. |
| 2013/0320935 A1* | 12/2013 | Freier .................... G05D 19/00 322/19 |

FOREIGN PATENT DOCUMENTS

| CN | 103940564 A | 7/2014 | |
| DE | 2734396 A1 | 2/1979 | |
| DE | 4032299 A1 * | 4/1992 | ............. G01H 1/003 |
| DE | 4032299 A1 | 4/1992 | |
| DE | 102008004061 A1 | 7/2009 | |
| EP | 0585623 A2 | 3/1994 | |
| GB | 867858 A | 5/1961 | |
| GB | 867858 | 4/2014 | |
| JP | S52110449 A | 9/1977 | |
| JP | S52143083 A | 11/1977 | |
| JP | S53132391 A | 11/1978 | |
| JP | S56166428 A | 12/1981 | |
| JP | S5822925 A | 2/1983 | |
| JP | S6159232 A | 3/1986 | |
| JP | S6242030 A | 2/1987 | |
| JP | S62259039 A | 11/1987 | |
| JP | H05149782 A | 6/1993 | |
| JP | 2000292252 A | 10/2000 | |
| RU | 2513646 C2 | 4/2014 | |
| RU | 2514977 C2 | 5/2014 | |

OTHER PUBLICATIONS

[E2: Exhibit in Opposition of EP3155228] Teilnehmerbefragung der 64 Zuhörer des Vortrages zu E1; Auswertung; durchgeführt von "Haus der Technik", Außeninstitut der RWTH Aachen; 2013; (Participant survey of the 64 listeners of the lecture on E1; Evaluation; conducted by "Haus der Technik", external institute of the RWTH Aachen; 2013).

[E3: Exhibit in Opposition of EP3155228] Auszug aus dem Archlv der Technischen Universität Dortmund, erstellt am Dec. 12, 2018: Bericht über die Durchführung der öffentlichen Tagung zu E1, freier Zugang für interessiertes Fachpublikum nach Anmeldung; 2018; (Excerpt from the archive of the Technical University of Dortmund, compiled on Dec. 12, 2018: Report on the implementation of the public conference on E1, free access for interested trade visitors after registration; 2018).

[E4: Exhibit in Opposition of EP3155228] Programm der 6. Essener Tagung Turbogeneratoren in Kraftwerken; Haus der Technik, Außeninstitut der RWTH Aachen; 2013; (Program of the 6th Essen Conference Turbogenerators in Power Plants; House of Engineering, External Institute of RWTH Aachen University; 2013).

[E5: Exhibit in Opposition of EP3155228] Wirsen, Andreas: "Online Monitoring von Torsionsschwingungen in Turbosätzen"; Vortrag; Turbogeneratoren in Kraftwerken; Haus der Technik Essen, Feb. 15, 2011; 2011; ("Online Monitoring of Torsional Vibrations in Turbosets"; lecture; Turbogenerators in power plants; House of Engineering Essen, Feb. 15, 2011; 2011).

[E6: Exhibit in Opposition of EP3155228] Teilnehmerbefragung der 73 Zuhörer des Vortrages zu E5; Auswertung; durchgeführt von "Haus der Technik", Außeninstitut der RWTH Aachen; 2011; (Participant survey of the 73 listeners of the lecture on E5; Evaluation; conducted by "House of Engineering", external institute of the RWTH Aachen; 2011).

[E7: Exhibit in Opposition of EP3155228] Auszug aus dem Archlv der Technischen Universität Dortmund; erstellt am Dec. 12, 2018: Bericht über die Durchführung der internationalen Tagung zu E5; 2011; (Excerpt from the archive of the Technical University of Dortmund; issued on Dec. 12, 2018: report on the conduct of the international session on E5; 2011).

[E9: Exhibit in Opposition of EP3155228] Purchase Order der Siemens Pte Ltd; 1. Apr. 2008.

[E10: Exhibit in Opposition of EP3155228] Weigel, Manfred & Olsen, Ulrich: "Erweiterte Diagnoseverfahren für Kraftwerksturbosätze"; vol. 3; W&O Seminare; Heppenheim; Sep. 2009; 2009; ("Extended diagnostic procedures for power plant turbo sets"; vol. 3; W & O seminars; Heppenheim; Sep. 2009; 2009; Attached in 3 parts, E10a, E10b, E10c due to file size).

[E11: Exhibit in Opposition of EP3155228] Kulig, Stefan: "Torsionsanalysesysteme mit berührungsloser Drehmomenterfassung"; Lehrstuhl Elektrische Antriebe und Mechatronik (EAM); Universität Dortmund; 2005; ("Torsion analysis systems with non-contact torque detection"; Chair of Electric Drives and Mechatronics (EAM); University of Dortmund; 2005).

[E12: Exhibit in Opposition of EP3155228] Jahresbericht des Fraunhofer ITWM des Jahres 2003, öffentlich zugänglich auf der Intemetseite des Fraunhofer-ITWM seit 2004 (https://www.itwm.fraunhofer.de/de/pressepublikationen/publikationenjahresberichte/jahresberichte/jahresberichte.html); 2004; (Annual report of the Fraunhofer ITWM for the year 2003, publicly available on the website of the Fraunhofer ITWM since 2004).

[E13 Exhibit in Opposition of EP3155228] Kulig, Stefan: "Torsionserfassungs- und -analysesysteme"; Vortrag auf der Messe: Sensor 2003; Nürnberg; 13.5-15.5.2003; 2003; ("Torsion detection and analysis systems"; Lecture at the fair: Sensor 2003; Nuremberg; 13.5-15.5.2003; 2003).

[E14: Exhibit in Opposition of EP3155228] Kulig, Stefan: "Torsionserfassungs- und analysesysteme"; Vortrags auf der Messe:

(56) References Cited

OTHER PUBLICATIONS

Husumwind 2003; Husum; 23.9-27.9.2003; 2003; ("Torsion detection and analysis systems"; Lecture at the fair: Husumwind 2003; Husum; 23.9-27.9.2003; 2003).

[E17: Exhibit in Opposition of EP3155228] Pastor, Miroslav et al.: "Modal Assurance Criterion"; Technical University of Kosîce, Faculty of Mechanical Engemeering; published by Elsevier Ltd.; pp. 543-548; 2012; 2012.

[E18: Exhibit in Opposition of EP3155228] Wirsen, Andreas & Soter, Stefan: "Berührungslose Drehmomenterfassung—Turbosätze altern unter strenger Beobachtung"; Artikel veröffentlicht in SENSOR report Feb. 2004; pp. 23-24; 2004; ("Non-contact torque detection—turbo sets age under close observation"; Article published in SENSOR report Feb. 2004; pp. 23-24; 2004).

[E19: Exhibit in Opposition of EP3155228] Ausdruck der Internetseite des Fraunhofer-ITWM von Jun. 2007; Torsionserfassungs- und analysesysteme; https://web.archive.Org/web/20070611023425/http:/www.itwm.fraunh ofer.de/de/as_asproducts_torsion/torsion/; (Printout of the website of the Fraunhofer ITWM from Jun. 2007; Torsion detection and analysis systems).

[E20: Exhibit in Opposition of EP3155228] Angebote an weitere Unternehmen; Supply Contracts; 2004-2005; (Offers to other companies; Supply Contracts; 2004-2005).

[E21: Exhibit in Opposition of EP3155228] Supply Contract and Purchase Order an ABB Utilities AB Dept. RUX; 2002.

[E22: Exhibit in Opposition of EP3155228] "Monitoring kritisch ansteigender Amplituden"; Beschreibung SSR Monitoring der Software TorFat; pp. 1-4; ("Monitoring critically increasing amplitudes"; Description SSR monitoring of TorFat software; pp. 1-4).

[E23: Exhibit in Opposition of EP3155228] Bedienungsanleitung des verkauften Sensors: "Induktiver Sensor zur berührungslosen Drehmomenterfassung"; Type 2000; pp. 1-19; 30.11.2012; 2012; (Instruction manual of the sold sensor: "Inductive sensor for non-contact torque detection"; Type 2000; pp. 1-19; 30.11.2012; 2012).

[E24: Exhibit in Opposition of EP3155228] Bedienungsanleitung des Programms TorFat: "Torsion Fatigue Analyser—Online—Monitoring von Torsionsschwingungen und Ermüdungsanalyse bei rotierenden Maschinen an der Messstelle"; pp. 1-11; (Operating Instructions of the TorFat program: "Torsion Fatigue Analyzer—Online Monitoring of Torsional Vibrations and Fatigue Analysis of Rotary Machines at the Measuring Point"; pp. 1-11).

[E26: Exhibit in Opposition of EP3155228] Schmidt, R.: "Schaufelschwingungsmessung—Abschätzung der Betriebsfrequenz der Schaufeln"; Auszug aus dem Problemseminar „Dynamik der Turbomaschinen; TU Dresden; 1977; ("Vane Vibration Measurement—Estimation of Operating Frequency of Blades"; Excerpt from the problem seminar "Dynamics of Turbomachinery"; TU Dresden; 1977).

EP Search Report dated Mar. 9, 2015, for EP patent application No. 14183042.2.

International Search Report dated Oct. 14, 2015, for PCT/EP2015/069642.

IPPR (PCT/IPEA/416 and 409) dated Oct. 19, 2016, for PCT/EP2015/069642.

Han Bao-Cai et al: "Dynamic Properties Analysis of Multi-Frequencies Coupled Rotor System in Aircraft Engine"; Journal of Vibration and Shock, Band 27 No. 8.

Eidesstattliche Versicherung / Affidavit of Dr. Matthias Humer dated Sep. 27, 2019, Non-patent literature cited during the opposition procedure; submitted to EPO by opponent on Oct. 4, 2019 in corresponding EP Application 15762950.2, with English machine translation.

Eidesstattliche Versicherung / Affidavit of Dr. Andreas Wirsen dated Sep. 27, 2019, Non-patent literature cited during the opposition procedure; submitted to EPO by opponent on Oct. 4, 2019 in corresponding EP Application 15762950.2, with English machine translation.

[E23: Exhibit in Opposition of EP3155228] Bedienungsanieitung des verkauften Sensors: "Induktiver Sensor zur berührungslosen Drehmornenterfassung"; Type 2000; pp. 1-19; Nov. 30, 2012; 2012; (Instruction manual of the sold sensor: "Inductive sensor for non-contact torque detection"; Type 2000; pp. 1-19; Nov. 30, 2012; 2012)

[E24: Exhibit in Opposition of EP3155228] Bedienungsanleitug de Programms TorFat: "Torsion tatigue Analyser—Online—Monitoring von Torsionsschwingungen und Ermüdungsanalyse bei rotierenden Maschinen an der Messstelle"; pp. 1-11; (Operationg Instructions of the TorFat program: "Torsion fatique Analyzer—Online Monitoring of Torsional Vibrations and Fatique Analysis of Rotary Machines at the Measuring Point"; pp. 1-11).

[E25 Exhibit in Opposition of EP3155228] Rechnung über die Durchführung der Inbetriebnahme des Drehmomentsensors und der Software des Vertrags des Dokuments E9; 2009; (invoice about the implementation of the commissioning of the Torque sensors and software of the contract of the document E9; 2009).

[E26: Exhibit in Opposition of EP3155228] Schmidt, R.: "Schaufelschwingungsmessung—Abschätzung der Betriebsfrequenz der Schaufeln"; Auszug aus dem Problernserninar „Dynarnik der Turbornaschinen; TU Dresden; 1977; ("Vane Vibration Measurement—Estimation of Operating Frequency of Blades"; Excerpt from the problem seminar "Dynamics of Turbomachinery"; TU Dresden; 1977).

[E1: Exhibit in Opposition of EP3155228] Wirsen, Andreas: "Anforderungen an ein Überwachungssystem zum Schutz von Turbosatzen vor kritischen subsynchronen Resonanzen"; Präsentation auf 6. Essener Tagung; Turbogeneratoren in Kraftwerken—Technik—Instandhaltung—Schäden; pp. 1-33; 21. Feb. 2013; stattgefunden und Folien ausgehändigt; 2013; ("Requirements for a monitoring system for the protection of turbo sets from critical subsynchronous resonances"; Presentation at the 6th Essen Conference; Turbogenerators in Power Plants—Technology—Maintenance—Damage; pp. 1-33; Feb. 21, 2013; took place and handed out slides; 2013).

[E8: Exhibit in Opposition of EP3155228] Schwibinger, Peter: "Torsionsschwingungen von Turbogruppen und Ihre Kopplung mit den Biegeschwingungen bei Getriebemaschinen"; Fortschr.-Berichte VDI; Reihe 11; No. 90; VDI-Verlag; 1987; pp. 2-61; ISBN 3-18-149011-3; 1987; ("Torsional vibrations of turbo groups and their coupling with the bending vibrations in gearboxes"; Progress Reports VDI; Row 11; No. 90; VDI-Verlag; , 1987; pp. 2-61; ISBN 3-18-149011-3; , 1987).

[E15: Exhibit in Opposition of EP3155228] Kulig, Stefan: "Torsionsanalysesysteme mit berührungsloser Drehmomenterfassung"; Lehrstuhl Elektrische Antriebe und Mechatronik (EAM); Universität Dortmund; Vortrag bei der Forschungsvereinigung Antriebstechnik; Fachbereich Geregelte Antriebe; Nov. 30, 2004; Frankfurt; 2004; ("Torsion analysis systems with non-contact torque detection"; Chair of Electric Drives and Mechatronics (EAM); University of Dortmund; Lecture at the Research Association for Propulsion Technology; Department of Controlled Drives; Nov. 30, 2004; Frankfurt; 2004).

[E16: Exhibit in Opposition of EP3155228] Humer, Matthias & Wirsen, Andreas: "Online Monitoring von Torsionsschwingungen in Wellensträngen von Kraftwerksturbosätzen"; Veröffentlichung des Referats Nr. 15, vorgestellt 2006 auf dem Symposium: Schwingungsdiagnostische Überwachung von Kraftwerksturbosatzen—Methoden, Nutzen, Erfahrungen; pp. 345-370; 2006; ("Online monitoring of torsional vibrations in wave trains of power plant turbo sets"; Publication of Unit No. 15, presented in 2006 at the Symposium: Vibration Diagnostic Monitoring of Power Station Turbosets—Methods, Benefits, Experiences; pp. 345-370; 2006).

\* cited by examiner

METHOD FOR OPERATING A MACHINE PLANT HAVING A SHAFT TRAIN

CROSS REFERENCE TO RELATED APPLICATIONS

This application is the US National Stage of International Application No. PCT/EP2015/069642 filed Aug. 27, 2015, and claims the benefit thereof. The International Application claims the benefit of European Application No. EP14183042 filed Sep. 1, 2014. All of the applications are incorporated by reference herein in their entirety.

FIELD OF INVENTION

The invention relates to a method for operating a machine plant having a shaft train.

BACKGROUND OF INVENTION

A machine plant, such as for example a power plant for generating electricity, has an electrical generator and at least one turbine, the turbine driving the generator. For this purpose, the turbine and the generator are arranged on a common shaft train. It is possible to provide couplings in the shaft train in order to couple individual turbines into the shaft train or decouple them from the shaft train.

During the operation of the power plant, the generator feeds electricity into a power grid. Electrical disturbances in the power grid may have the effect that a torsional oscillation of the shaft train is induced by the generator. In the worst case, the shaft train may be induced to oscillate at one of its natural frequencies. Being induced to oscillate at a natural frequency has the effect of high torsional stress loading of the shaft train, which may lead to a reduction in its service life or to the formation of stress cracks. It is expected that the disturbances in the power grid will occur more frequently in the future, because the structures of the power grid are changing in the course of the transition to new forms of energy.

Conventionally, the loading of the shaft train is measured, by its rotational speed being measured with high resolution at a number of axial positions of the shaft train. The loading of the shaft train is then concluded from the differences in the rotational speeds at the different axial positions. However, in this method the measuring technique and the associated evaluation are complex. It is alternatively possible to measure oscillations in the electrical energy delivery of the power plant.

In the event that potential oscillations are identified in the energy delivery, no conclusions as to the actual loading of the shaft train can be drawn however.

DE 40 32 299 A1 describes a method for monitoring a rotatable component in which the oscillation excursion of the component in the radial direction in relation to the component and the rotational position of the component are measured time-dependently. EP 0 585 623 A2 describes a method for the early detection of a crack in a rotating shaft. DE 27 34 396 A1 describes a method for monitoring torsional oscillations on shafts in which the instantaneous power of the generator is measured.

SUMMARY OF INVENTION

An object of the invention is to provide a method for operating a machine plant having a shaft train in which loads on the shaft train caused by torsional oscillations can be easily detected.

The method according to the invention for operating a machine plant having a shaft train has the steps of: a) computationally determining the natural frequency of at least one torsional oscillation mode of the shaft train and computationally determining the mechanical stresses of the shaft train occurring during an oscillation period of the torsional oscillation mode; b) determining in each case a correlation for each torsional oscillation mode between a first stress amplitude, which occurs at a position of the shaft train that is susceptible to the formation of torsional stress damage, and a second stress amplitude, which occurs at a measuring location of the shaft train, on the basis of the stresses computationally determined for the respective torsional oscillation mode; c) establishing a maximum first stress amplitude for the position; d) determining a maximum second stress amplitude, corresponding to the maximum first stress amplitude, for the measuring location on the basis of the correlation; e) measuring the stress of the shaft train while the shaft train is rotating at the measuring location in a time-dependent manner; f) determining a stress amplitude at each natural frequency from the measured stress; g) emitting a signal in the event that, at one of the natural frequencies, the stress amplitude determined from the measured stresses reaches the maximum second stress amplitude.

By determining the correlations between the stress amplitudes occurring at the position and the measuring location from the computationally determined stresses, stress amplitudes can be advantageously determined at measuring locations of the shaft train that are not accessible for measurement. A single measuring location on the shaft train is sufficient for determining the stress amplitudes at the position, while any location can be chosen as the measuring location. As a result, the method can be carried out advantageously easily. By determining a correlation for each torsion mode, the stress amplitudes at the position can be advantageously determined with a high degree of accuracy.

In response to the signal, measures can be taken to reduce the torsional oscillations of the shaft train. If the machine plant is a power plant for feeding electricity into a power grid, a desynchronization between the oscillation-inducing factors from the power grid and the torsional oscillations of the shaft train may for example be performed. This may take place for example by changing the natural frequencies of the shaft train by decoupling a turbine or a plurality of turbines from the shaft train. It is also possible to decouple the power plant from the power grid by disconnecting electrical lines.

Advantageously, in step e) the stress is measured by means of a magnetostrictive sensor and/or by means of a strain gage, the stresses measured by means of the strain gage being transmitted by means of telemetry. The magnetostrictive sensor generates a high-frequency magnetic field by means of a transmitting coil and floods the surface of the shaft train with the magnetic field. The magnetostrictive sensor has one or more receiving coils, which with the transmitting coil form a magnetic circuit and are arranged specifically for the detection of torsional oscillations. With the specific arrangement of the transmitting coil and receiving coils, the magnetic susceptibility at the surface of the shaft train can be determined. Because the magnetic susceptibility of a body depends on its mechanical stress as a result of the Villari effect, the signal detected by the receiving coils also depends on the mechanical stress of the surface of the shaft train. The magnetostrictive sensor emits an analog output signal that is proportional to the torsional stress of the shaft train. As a result of the proportionality of the output signal in relation to the torsional stress, the data processing is advantageously of computationally low intensity, as a result of which the method can be carried out easily and quickly. Both the magnetostrictive sensor and the strain gage determine the stress of the shaft train directly, whereby the method can likewise be carried out easily.

It is advantageous that in step f) the stresses measured in step e) are filtered by means of a bandpass filter, which allows a frequency band arranged around the natural frequency to pass, and/or that a Fourier transformation, in particular a fast Fourier transformation, of the stresses measured in step e) is carried out. This allows the stress amplitudes of the different torsional oscillation modes to be determined advantageously easily. In the event that the bandpass filter is used, in step g) the signal can be emitted just a short time after reaching the maximum second stress amplitude. In the event that the Fourier transformation or the fast Fourier transformation is used, the transmission of the signal takes place after completion of the calculation.

It is advantageous that in step e) the stress is measured at a plurality of measuring locations arranged at different axial positions of the shaft train. Here it is possible to achieve a high degree of measuring accuracy of the natural frequencies by arithmetic averaging of the natural frequencies determined in the plurality of measuring locations. Moreover, it may happen that one of the measuring locations coincides with an oscillation node of one of the torsional oscillation modes, as a result of which the measuring location would not be able to detect the torsional oscillation mode. By providing the plurality of measuring locations, the probability of all the oscillation nodes for a torsional oscillation mode lying at the measuring locations is very low. Consequently, all the relevant torsional oscillation modes can be detected with a high degree of probability.

Advantageously only the measuring location that has the highest mechanical stress, computationally determined in step a), for a selected torsional oscillation mode is used in step f) for the selected torsional oscillation mode. As a result, a high signal-to-noise ratio is advantageously achieved in the determination of the stress amplitudes. It is advantageous that in step f) there is an assignment of the stress amplitudes to one of the natural frequencies, in which an experimental ratio of the stress amplitudes and/or oscillation phases, determined in step f), at the plurality of measuring locations is formed, a computational ratio of the computationally determined stress amplitudes and/or oscillation phases at the plurality of measuring locations is formed and the experimental ratio is compared with the computational ratio. The comparison of the experimental ratio with the computational ratio allows the torsional oscillation modes in which the shaft train vibrates to be advantageously determined correctly with a high degree of probability.

It is advantageous that the natural frequencies computationally determined in step a) are either lower or equal to two and a half times the rotational frequency of the shaft train or, in the event that the machine plant is a power plant for generating electricity and the grid frequency is higher than the rotational frequency, lower or equal to two and a half times the grid frequency. These natural frequencies result in particularly strong stress loads on the shaft train, and so monitoring of these frequencies is particularly advantageous. In step a) the centrifugal loading that the shaft train has during the operation of the machine plant is advantageously taken into account in the computational determination of the natural frequency and the mechanical stresses. This allows the first stress amplitudes to be determined with a high degree of accuracy. The correlation between the first stress amplitude and the second stress amplitude that is determined in step b) is advantageously a proportionality.

In step c) an additional third maximum stress amplitude, which is higher than the first maximum stress amplitude, is advantageously established for the position, in step d) a maximum fourth stress amplitude, corresponding to the maximum third stress amplitude, is determined for the measuring location on the basis of the correlation and in step g) a stop signal is emitted in the event that the stress amplitude at the natural frequency that is determined in step f) reaches the maximum fourth stress amplitude, the stop signal initiating a shutdown of the machine plant. In this way, excessive stress loading of the shaft train can be advantageously automatically prevented.

The method advantageously has the step: d1) coarse calibration of the magnetostrictive sensor and/or the strain gage on a shaft that is loaded with a defined stress by means of a testing machine. It is advantageous that the machine plant has a generator and that the method is carried out with the step: d2) fine calibration of the magnetostrictive sensor and/or the strain gage during the rotation of the shaft train by using a stress that is determined at the measuring location by using the power delivered by the generator. The torque that the generator exerts on the shaft train can be concluded from the power delivered by the generator. The stresses occurring in the shaft train can then be concluded from the torque. This advantageously allows the calibration to be performed on the actual shaft train and during the operation of the machine plant.

It is advantageous that in step b) correlations are determined for a plurality of positions of the shaft train that are susceptible to the formation of stress damage, in step c) a respective maximum first stress amplitude is established for each position, in step d) a corresponding maximum second stress amplitude is determined for each of the positions and in step g) the signal is emitted in the event that one of the maximum second stress amplitudes is reached. This advantageously allows a plurality of critical locations of the shaft train to be monitored with just a single measuring location. The maximum first stress amplitudes at the various positions may in this case be the same or different from one another. It is also possible to establish third maximum stress amplitudes for the plurality of positions, it also being possible for these to be the same or different from one another.

It is advantageous that the measuring locations on the shaft train are arranged in the region of an exposed portion of the shaft train, in the region of a portion of the shaft train that is accessible for the measuring technique and/or in the region of a computationally determined stress maximum. The positions are advantageously arranged in the region of bearings, couplings and/or blade roots. These are advantageously positions that are particularly susceptible to stress damage. Advantageously, in step a) the natural frequencies and the stresses are computationally determined by means of a finite element method.

BRIEF DESCRIPTION OF THE DRAWINGS

The method according to the invention is explained in more detail below on the basis of the accompanying schematic drawing, in which.

DETAILED DESCRIPTION OF INVENTION

Figure 1:
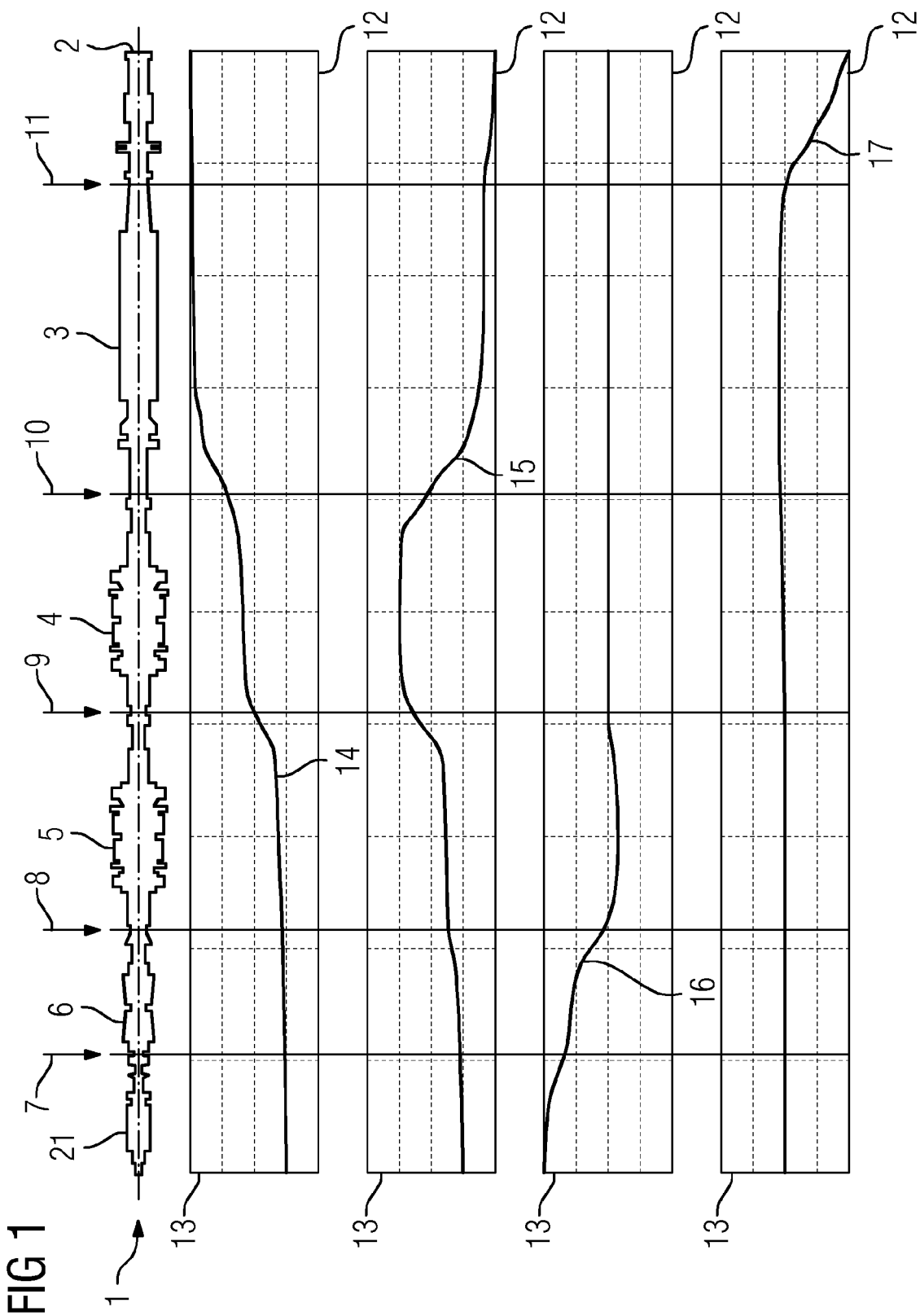
FIG. 1 shows a side view of a shaft train with four computationally determined torsion modes.
Figure 2:
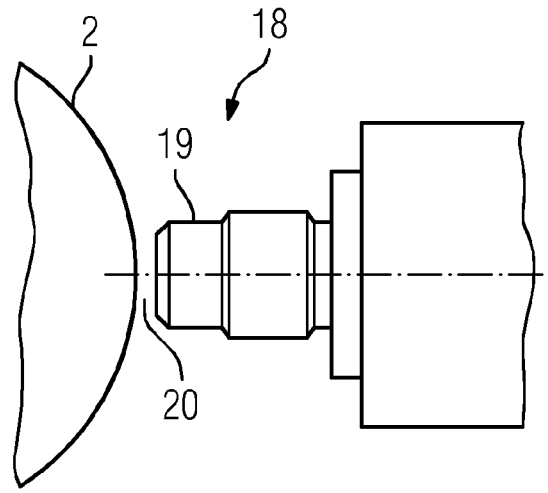
FIG. 2 shows a cross section through a shaft train with a magnetostrictive sensor and FIG. 3 shows a flow diagram of a method given by way of example.

As can be seen from FIG. 1, a machine plant 1 has a generator 3 and at least one turbine, the generator 3 and the turbine being arranged on a common shaft train 2. The machine plant 1 may also have a plurality of shaft trains, the method being carried out with each of the shaft trains. The machine plant according to FIG. 1 has a first turbine 4, a second turbine 5, a third turbine 6 and a fourth turbine 21, which are arranged in this sequence with increasing distance from the generator 3 on one axial side of the generator 3. The shaft train 2 has a first measuring location 7, a second measuring location 8, a third measuring location 9, a fourth measuring location 10 and a fifth measuring location 11, which are arranged at various axial positions of the shaft train 2 that are accessible for a measuring technique.

Likewise represented in FIG. 1 are computationally determined torsion oscillation modes. The four lowest-frequency torsional oscillation modes 14 to 17 are represented there, the first torsional oscillation mode 14 having the lowest natural frequency, the second torsional oscillation mode 15 having the second-lowest natural frequency, the third torsional oscillation mode 16 having the third-lowest natural frequency and the fourth torsional oscillation mode 17 having the fourth-lowest natural frequency. The four natural frequencies are in this case lower than two and a half times the rotational frequency of the shaft train or two and a half times the grid frequency, depending on which of the two frequencies is higher. Each of the torsional oscillation modes 14 to 17 is described by a respective plot, in which the axial position of the shaft train 2 is plotted on the x axis 12 and the torsion angle of the shaft train 2 is plotted on the y axis 13. Because the gradient of the torsion angle is proportional to the mechanical stress, the mechanical stress can be computationally determined by forming the gradient of the torsion angle. It is also possible to determine the mechanical stress by means of a finite element method.

In the method, at least one position of the shaft train 2 that is susceptible to the formation of stress damage is identified. The stress damage may take the form of stress cracks and/or forced ruptures. These positions may for example lie in the region of bearings, couplings and/or blade roots. For each of the positions, a maximum first stress amplitude is established, chosen such that it is not reached during normal operation of the machine plant in which no resonant disturbances occur. It is also chosen such that, when it is reached, still no stress damage occurs at the position. The maximum first stress amplitude is in this case the same for all the torsional oscillation modes 14 to 17. It is also possible to establish for the position a maximum third stress amplitude that is higher than the maximum first stress amplitude. The third maximum stress amplitude is in this case chosen such that, when it is reached, still no stress damage occurs on the shaft train.

On the basis of the computationally determined stresses, a correlation between the stress amplitude at the position and the stress amplitude at at least one of the measuring locations 7 to 11 is determined for each torsional oscillation mode, the correlation being a proportionality. On the basis of the correlation, a second maximum stress amplitude can be determined for the measuring location 7 to 11, the second maximum stress amplitude occurring at the measuring location 7 to 11 when the first maximum stress amplitude occurs at the position. On the basis of the correlation, a fourth maximum stress amplitude can also be determined for the measuring location 7 to 11, the fourth maximum stress amplitude occurring at the measuring location 7 to 11 when the third maximum stress amplitude occurs at the position.

The mechanical stress of the radially outer-lying surface of the shaft train 2 is measured at each measuring location 7 to 11 with in each case at least one magnetostrictive sensor 18. For reasons of redundancy, a plurality of magnetostrictive sensors may be provided at each measuring location 7 to 11. The magnetostrictive sensor 18 has a transmitting coil, by means of which a magnetic field is generated. The surface of the shaft train 2 is flooded with the magnetic field. The magnetostrictive sensor 18 has a receiving coil or a number of receiving coils, which are arranged in a magnetic circuit together with the transmitting coil and the flooded surface of the shaft train 2 in such a suitable way that the magnetic susceptibility of the surface of the shaft train 2 can thereby be determined. As a result of the Villari effect, the magnetic susceptibility of the shaft train 2 depends on its mechanical stress. The signal emitted by the magnetostrictive sensor is in this case proportional to the torsional stress of the magnetic field. As can be seen in FIG. 1, the excitation coil and the receiver coils are integrated in a measuring head 19 of the magnetostrictive sensor 18. Arranged between the measuring head 19 and the shaft train 2 is an air gap 20, whereby the method can be carried out contactlessly with the magnetostrictive sensor 18.

In the method, the mechanical stresses are measured in a time-resolved manner by means of the magnetostrictive sensor 18. The measured stresses can then be filtered by means of a bandpass filter, which allows a frequency band arranged around the natural frequency of the torsional oscillation mode to pass. It is alternatively possible to evaluate the measured stresses by means of a Fourier transformation, in particular a fast Fourier transformation. As soon as this filtered stress or the stress amplitude obtained by means of the Fourier transformation reaches or exceeds the second maximum stress amplitude, a signal is emitted. In the event that the natural frequencies lie close together, it may be necessary to provide a bandpass filter that allows natural frequencies for a plurality of torsional oscillation modes to pass. In this case, the signal is emitted when the filtered stress reaches or exceeds the lowest of the second maximum stress amplitudes of the plurality of torsional oscillation modes. In the event that a maximum fourth stress amplitude is provided, a shutdown of the machine plant 1 may be provided in the event that the filtered stress reaches or exceeds the maximum fourth stress amplitude.

It is possible to use only a single measuring location 7 to 11 for a specific torsional oscillation mode 14 to 17. In this case, the measuring location 7 to 11 that has the highest computationally determined stress for the specific torsional oscillation mode 14 to 17 may be used in order to achieve a high signal-to-noise ratio. For this purpose it is possible to identify in FIG. 1 for each torsional oscillation mode 14 to 17 the measuring location 7 to 11 that has the greatest gradient of the torsion angle. Alternatively, it is possible to identify for each torsional oscillation mode 14 to 17 the measuring location 7 to 11 that has the highest computationally determined stresses. In FIG. 1, this is for example the third measuring location 9 for the first torsional oscillation mode 14, the third measuring location 9 for the second torsional oscillation mode 15, the second measuring location 8 for the third torsional oscillation mode 16 and the fifth measuring location 11 for the fourth torsional oscillation mode 17.

It is likewise possible to use the stresses measured at a plurality of measuring locations 7 to 11 in order to identify the torsional oscillation mode 14 to 17 in which the shaft train 2 oscillates. For this purpose, a computational ratio of the form $A_{r1}:A_{r2}: \ldots :A_{rn}$ is formed for each torsional oscillation mode 14 to 17, where $A_{rx}$ is the computationally determined stress amplitude at the xth measuring location and n is the number of measuring locations. An experimental ratio of the form $A_{e1}:A_{e2}: \ldots :A_{en}$ is formed from the stress amplitudes determined from the measurements, where $A_{ex}$ is the stress amplitude determined from the measurements at the xth measuring location. By comparing the computational ratio with the experimental ratio, the torsional oscillation mode in which the shaft train 2 oscillates can be uniquely assigned even when the natural frequencies of the various torsional oscillation modes lie close together.

Figure 3:
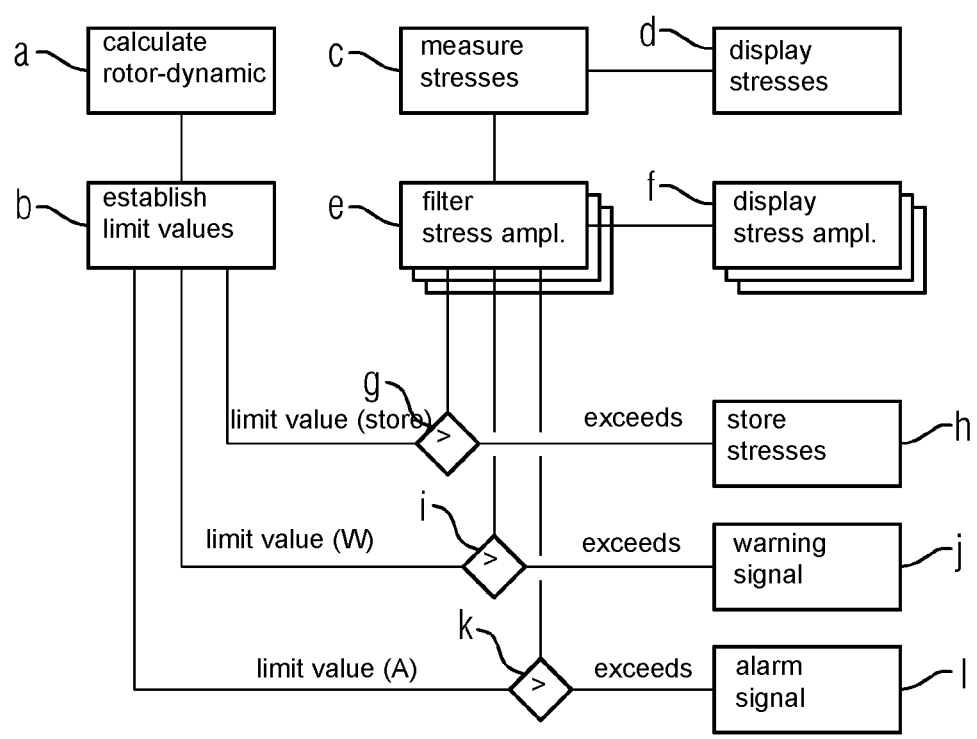

FIG. 3 illustrates the method in a flow diagram. In step a a rotor-dynamic calculation is carried out, in which the natural frequency for at least one torsional oscillation mode of the shaft train 2 and the mechanical stresses of the shaft train 2 occurring during an oscillation period of the torsional oscillation mode are computationally determined. In step b three limit values $\sigma_{STORE}$, $\sigma_W$ and $\sigma_A$ are established, where $\sigma_{STORE}<\sigma_W<\sigma_A$, $\sigma_W$ is the second maximum stress amplitude and $\sigma_A$ is the fourth maximum stress amplitude. In this case, $\sigma_{STORE}=0.5*\sigma_A$ and $\sigma_W=0.75*\sigma_A$ may be chosen for example.

In step c the stresses of the shaft train 2 are measured and in step d the measured stresses are displayed. In step e the measured stresses are filtered by means of the bandpass filters in order to determine the stress amplitudes at the respective natural frequency. In step f the filtered stress amplitudes are displayed.

In step g it is enquired whether the filtered stress amplitude exceeds the limit value $\sigma_{STORE}$. If this is the case, in step h the measured stresses are stored. It is alternatively possible to store the measured stresses all the time at great time intervals and in step h to store the measured stresses at small time intervals.

In step i it is enquired whether the filtered stress amplitude exceeds the limit value $\sigma_W$. If this is the case, in step j a warning signal is emitted. In step k it is enquired whether the filtered stress amplitude exceeds the limit value $\sigma_A$. If this is the case, in step l an alarm signal is emitted. The alarm signal may have the effect that an operator of the machine plant shuts it down manually. Alternatively, the alarm signal may have the effect that an automatic shutdown of the machine plant takes place.

Although the invention has been described and illustrated in more detail by way of the preferred exemplary embodiment, the invention is not restricted by the disclosed examples and other variations can be derived herefrom by a person skilled in the art without departing from the scope of protection of the invention.

The invention claimed is:

1. A method for operating a machine plant having a shaft train, comprising the steps of:
    a) computationally determining the natural frequency of at least one torsional oscillation mode of the shaft train and computationally determining the mechanical stresses of the shaft train occurring during an oscillation period of the torsional oscillation mode;
    b) determining in each case a correlation for each torsional oscillation mode between a first stress amplitude, which occurs at a position of the shaft train that is susceptible to the formation of stress damage, and a second stress amplitude, which occurs at a measuring location of the shaft train, on the basis of the stresses computationally determined for the respective torsional oscillation mode;
    c) establishing a maximum first stress amplitude for the position;
    d) determining a maximum second stress amplitude, corresponding to the maximum first stress amplitude, for the measuring location on the basis of the correlation;
    e) measuring the stress of the shaft train while the shaft train is rotating at the measuring location in a time-dependent manner;
    f) determining a stress amplitude at each natural frequency from the measured stress;
    g) emitting a signal in the event that, at one of the natural frequencies, the stress amplitude determined from the measured stresses reaches the maximum second stress amplitude.

2. The method as claimed in claim 1,
    wherein in step e) the stress is measured by means of a magnetostrictive sensor and/or by a strain gage, the stresses measured by the strain gage being transmitted by telemetry.

3. The method as claimed in claim 1,
    wherein in step f) the stresses measured in step e) are filtered by a bandpass filter, which allows a frequency band arranged around the natural frequency to pass, and/or a Fourier transformation or a fast Fourier transformation, of the stresses measured in step e) is carried out.

4. The method as claimed in claim 1,
    wherein in step e) the stress is measured at a plurality of measuring locations arranged at different axial positions of the shaft train.

5. The method as claimed in claim 4,
    wherein only the measuring location that has the highest mechanical stress, computationally determined in step a), for a selected torsional oscillation mode is used in step f) for the selected torsional oscillation mode.

6. The method as claimed in claim 4,
    wherein in step f) there is an assignment of the stress amplitudes to one of the natural frequencies, in which an experimental ratio of the stress amplitudes and/or oscillation phases, determined in step f), at the plurality of measuring locations is formed, a computational ratio of the computationally determined stress amplitudes and/or oscillation phases at the plurality of measuring locations is formed and the experimental ratio is compared with the computational ratio.

7. The method as claimed in claim 1,
    wherein the natural frequencies computationally determined in step a) are either lower or equal to two and a half times the rotational frequency of the shaft train or, in the event that the machine plant is a power plant for generating electricity and the grid frequency of the power plant is higher than the rotational frequency, lower or equal to two and a half times the grid frequency.

8. The method as claimed in claim 1,
    wherein in step a) the centrifugal loading that the shaft train has during the operation of the machine plant is taken into account in the computational determination of the natural frequency and the mechanical stresses.

9. The method as claimed in claim 1,
    wherein the correlation between the first stress amplitude and the second stress amplitude that is determined in step b) is a proportionality.

10. The method as claimed in claim 1,
wherein in step c) an additional third maximum stress amplitude, which is higher than the first maximum stress amplitude, is established for the position, in step d) a maximum fourth stress amplitude, corresponding to the maximum third stress amplitude, is determined for the measuring location on the basis of the correlation and in step g) a stop signal is emitted in the event that the stress amplitude at the natural frequency that is determined in step f) reaches the maximum fourth stress amplitude, the stop signal initiating a shutdown of the machine plant.

11. The method as claimed in claim 2, further comprising the step of:
d1) coarse calibration of the magnetostrictive sensor and/or the strain gage on a shaft that is loaded with a defined stress by means of a testing machine.

12. The method as claimed in claim 2,
wherein the machine plant has a generator, further comprising the step of:
d2) fine calibration of the magnetostrictive sensor and/or the strain gage during the rotation of the shaft train by using a stress that is determined at the measuring location by using the power delivered by the generator, the torque that the generator exerts on the shaft train being concluded from the power delivered by the generator and the stresses occurring in the shaft train then being concluded from the torque.

13. The method as claimed in claim 1,
wherein in step b) correlations are determined for a plurality of positions of the shaft train that are susceptible to the formation of stress damage,
in step c) a respective maximum first stress amplitude is established for each position,
in step d) a corresponding maximum second stress amplitude is determined for each of the positions and
in step g) the signal is emitted in the event that one of the maximum second stress amplitudes is reached.

14. The method as claimed in claim 1,
wherein the measuring locations on the shaft train are arranged in the region of an exposed portion of the shaft train, in the region of a portion of the shaft train that is accessible for the measuring technique and/or in the region of a computationally determined stress maximum.

15. The method as claimed in claim 1,
wherein the positions are arranged in the region of bearings, couplings and/or blade roots.

* * * * *